United States Patent [19]

Elber

[11] 4,274,901
[45] Jun. 23, 1981

[54] METHOD OF MAKING A PARTIAL INTERLAMINAR SEPARATION COMPOSITE SYSTEM

[75] Inventor: Wolf Elber, Newport News, Va.

[73] Assignee: The United States of America as represented by the Administrator of the National Aeronautics and Space Administration, Washington, D.C.

[21] Appl. No.: 119,337

[22] Filed: Feb. 7, 1980

Related U.S. Application Data

[62] Division of Ser. No. 889,671, Mar. 24, 1978, Pat. No. 4,229,473.

[51] Int. Cl.$^3$ ............................................. B32B 31/20
[52] U.S. Cl. ................................. 156/242; 156/245; 156/252; 156/264; 156/285; 156/290
[58] Field of Search ............... 156/228, 242, 245, 252, 156/264, 288, 290, 285

[56] References Cited

U.S. PATENT DOCUMENTS

| 1,943,757 | 1/1934 | Delaney | 156/252 |
| 2,054,210 | 9/1936 | Weisenburg | 156/290 |
| 3,442,741 | 5/1969 | Specht | 156/245 |
| 4,063,981 | 12/1977 | Rhodes et al. | 156/245 |

FOREIGN PATENT DOCUMENTS

| 1167342 | 11/1958 | France | 156/252 |
| 305694 | 2/1929 | United Kingdom | 156/252 |

Primary Examiner—Caleb Weston
Attorney, Agent, or Firm—Howard J. Osborn; John R. Manning; Wallace J. Nelson

[57] ABSTRACT

This invention relates to an interlaminar separation system for composites wherein a thin layer of a perforated foil film is interposed between adjacent laminae of a composite formed from prepreg tapes to thereby permit laminae adherence through the perforations and produce a composite structure having improved physical property characteristics.

3 Claims, 4 Drawing Figures

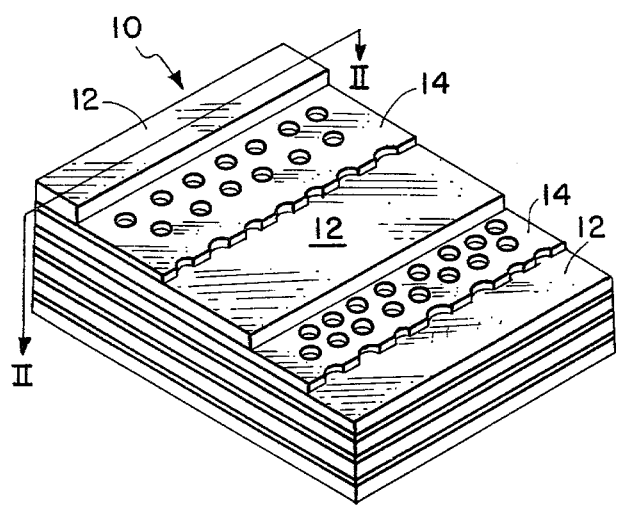
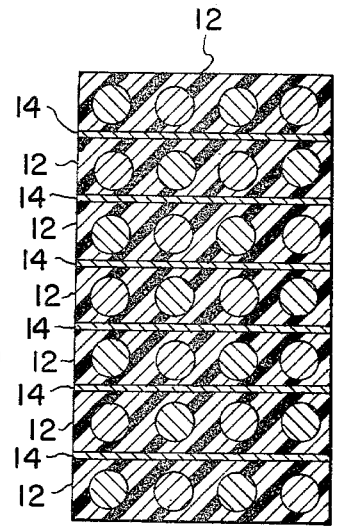
FIG. 1     FIG. 2
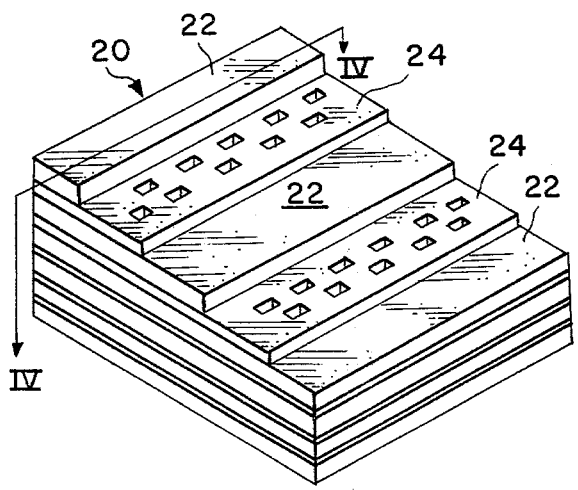
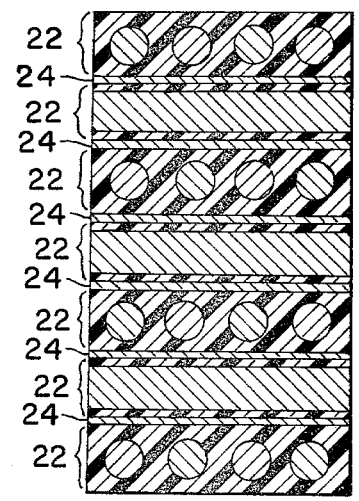
FIG. 3     FIG. 4

METHOD OF MAKING A PARTIAL INTERLAMINAR SEPARATION COMPOSITE SYSTEM

ORIGIN OF THE INVENTION

The invention described herein was made by an employee of the United States Government and may be manufactured and used by or for the Government for governmental purposes without the payment of any royalties thereon or therefore.

This is a division of application Ser. No. 889,671, filed Mar. 24, 1978, now U.S. Pat. No. 4,229,473.

BACKGROUND OF THE INVENTION

Composite materials are contemplated for use in reducing the structural weight and increasing the strength and fatigue life of contemporary and future aerospace vehicles. It is anticipated that research by government and industry to improve these physical property characteristics of composites will continue for many years. One of the problems inherent in composite structures has been the fatigue life of epoxy-matrix composites and efforts to improve or increase this and other physical properties of composites are continuing.

Fracture and notch-strength tests of graphite-epoxy composites have shown that unidirectional layups generally exhibit longitudinal cracking before failure, whereas multidirectional layups fail transversely with little longitudinal cracking. By a simple qualitative analysis it has been shown that the higher matrix shear stresses in unidirectional materials cause the longitudinal cracking and that this cracking is responsible for the increased toughness of unidirectional components.

Although graphite-epoxy composites have a high strength-to-density ratio, they lack ductility and are more notch-sensitive and more damage-sensitive than many common metallic materials. Notch-strength, fracture toughness, and impact resistance are of concern in primary structures, and several methods have been proposed previously to improve these properties. For example, hybrid composites use combinations of various fibers, such as fiberglass and graphite, or Kevlar and graphite to increase the impact resistance and notch strength. In some prior art hybrids the lower modulus fibers (glass or Kevlar) and the graphite fibers are confined to separate laminae, while in others they are mixed within each laminae. This hybridization also increases the fracture toughness of the composite. The softening-strip method uses lower modulus fibers in specific areas such as fastener rows to increase notch-strength and toughness. In all of these prior art systems, the strength-to-density ratio is lower than for graphite-epoxy alone.

It is an object of the present invention to improve the notch-strength and toughness of a composite structure without resorting to lower modulus fibers.

It is a further object of the present invention to provide a new and improved composite structure.

It is another object of the present invention to provide a novel process for making composites that have improved interlaminar strength property characteristics.

An additional object of the present invention is an improved composite structure that has improved physical property characteristics of toughness, notch-strength and impact strength.

According to one aspect of the present invention the foregoing and other objects are attained by placing thin perforated polyester films between some or all of the laminae in a composite layup and curing the composite layup to cause resin flow through the perforations for bonding of the individual laminae.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein:

FIG. 1 is an enlarged fragmentary perspective of one composite layup according to the present invention;

FIG. 2 is a sectional view taken along line II—II of FIG. 1;

FIG. 3 is a view similar to FIG. 1 showing an additional embodiment for the separator system of the present invention; and FIG. 4 is a view similar to FIG. 2 showing an additional embodiment of the composite prepreg layup.

DETAILED DESCRIPTION OF THE INVENTION

Referring now to the drawings and more particularly to FIG. 1 there is shown a portion of a composite body constructed according to the present invention and designated generally by reference numeral 10. Composite body 10 is formed of a plurality of layers of prepreg tape 12, three of which are shown partially exposed in FIG. 1 and with a layer of thin perforated foil 14 disposed between each adjacent two layers of prepreg tape. The prepreg tapes making up each layer in composite body 10 are commercially available from a variety of manufacturers in various widths and thicknesses and are fabricated from unidirectional fibers impregnated with a thermosetting resin. One such prepreg material is available from the Whittaker Corporation, Narmco Materials Division, 600 Victoria Street, Costa Mesa, Calif., 92627, under the tradename RIGIDITE 5208. This tradename material is a thermosetting epoxy resin employed as the matrix system with a variety of carbon fibers to produce RIGIDITE prepreg.

The term "prepreg" is a term of art that denotes preimpregnated unidirectional continuous filament fiber materials that may be temperature cured to provide a rigid composite structure. The impregnation of the carbon fibers is accomplished by the hot melt process that is free of solvents to provide outstanding handling characteristics, tack, long out-time, and essentially void-free laminates. After impregnation with the epoxy, the resulting prepreg is cut into the desired width and rolled for storage under refrigeration in the temperature range of 0° C. or below and in a sealed container. The storage life of the prepreg at these temperatures is at least six months although the manufacturer only provides a warranty period of 90 days. If maintained at room temperature, that is, 70° ±5° F., the storage life is approximately 14 days. The graphite or carbon fibers utilized in making the prepreg are available in various diameters from numerous commercial sources, for example, Hercules, Union Carbide, and others. In one specific example of the Whittaker Corporation product the prepreg employed was RIGIDITE 5208-T-300 wherein the T-300 refers to Union Carbide's tradename THORNEL 300 graphite fibers. These and other fibers contemplated in use of the present invention are continuous type fibers that extend the length of the prepreg tapes. Other prepreg tapes that are suitable for practice in the present invention are commercially available from the 3-M Company, Fiberite Company, and others. Although the prepreg tapes are sold commercially in various widths, from slit widths as narrow as 0.376 inch to 12 inch widths, the most commonly used width is 3 inch. These widths may be cut when ready for use to that desired for the particular application. Also, the thickness of the prepreg tapes that are commercially available vary from those providing a cured ply thickness in the range of 0.0015 inch to 0.0025 inch for ultrathin applications to the standard range of 0.005 inch to 0.008 inch as employed in the specifically described application herein. The cured thickness of a single-ply or layer is primarily dependent upon the graphite fiber diameter with the prepreg tapes having a fiber content of 58 ±3% by volume, an epoxy content of 42 ±3% and with a 60–40% graphite/epoxy being preferred.

As shown in FIG. 1, a plurality of equal lengths of prepreg tape 12 are cut and laid down on a clean surface for example, an aluminum or stainless steel plate. When the width of the final structure to be built exceeds the width of the tape employed, the various lengths of tapes are combined and laid up in side-by-side relationship to provide the necessary width. Each layer or ply of the thus formed wide surface area is provided with staggered surfaces between the adjacent tape sections forming the ply to prevent bulges at the seams where the various widths of tapes are connected. A layer of a thin perforated foil material 14 such as for example, a polyester, is disposed between each ply of the prepreg tape as shown more particularly in FIG. 2. The layup or plurality of lengths of material formed are stacked to obtain the desired thickness and in the specific examples tested herein ten layers or plys of tape were stacked by hand to form the laminate approximately 0.050 inch thick. The stacked assembly is then cured under vacuum and pressure at an elevated temperature in a conventional manner. After cooling to room temperature the final cured structure 10 may be machined, cut or otherwise utilized to obtain the final exterior configuration desired. During the curing process the epoxy in prepreg tapes 12 flows through the perforations in the preforated foil sheets 14 to cause interbonding between the adjacent laminae of the stacked assembly. Although the epoxy does not adhere readily to the polyester foil separator sheets, the bonding occurring through the perforations thereof ensure an adequate lamination for the entire assembly 10. As shown in FIG. 2 of the drawings, the graphite fibers in the prepreg tape layers 12 are maintained in a unidirectional relationship throughout the stacked assembly 10 of this embodiment.

Referring now more particularly to FIGS. 3 and 4, an alternate embodiment of composite body 20 is shown. In this embodiment the prepreg tape layers 22 are also provided with a thin perforated foil layer 24 between each two layers of prepreg tape. However, the direction of the fibers in the prepreg tape layers 22 are alternated such that alternate layers of the prepreg tape have the direction of the unidirectional fibers extending therethrough in a perpendicular or 90° relationship to that in the next adjacent prepreg layer. Rectangular perforations or slots for foil layers 24 were employed in this embodiment in lieu of the circular perforations employed in the embodiment illustrated in FIG. 1.

Thus, in the composite structural components shown, holes and slots interrupt the adjacent fiber layers. In unidirectional composites, only intralaminar shear stresses in the matrix material transfer loads from interrupted fibers to continuous fibers. In multidirectional composites, interlaminar shear stresses transfer loads from interrupted fibers in one laminae to continuous fibers in other laminae. The notch-strength and fracture behavior of these two kinds of composites, differ as will be further explained hereinafter.

In the fracturing of notched-unidirectional composites (FIGS. 1 and 2), matrix shear failures occur before the fibers are loaded to the ultimate strength. Thus, longitudinal cracks will form along the edges of the notch before the section of the test piece fails. This type of rupture or damage is considered matrix controlled. Thus, the rupture force flows out of the interrupted fibers and into the matrix surrounding the unidirectional fibers which transfers force from the interrupted fibers to the continuous fibers. In most epoxy-matrix composites these shear stresses are high enough to cause matrix shear failure before the tensile stress in the continuous fibers reaches the fiber tensile strength. The resulting longitudinal cracks move the load-transfer sites away from the edge of the notch and limit the stress concentration in the continuous fibers.

This is in contrast to the multidirectional graphite/epoxy composites illustrated in FIGS. 3 and 4 which fail by transverse cracking at net section stresses much lower than in unidirectional or 0° composites. In these composites there is less matrix cracking before the most highly stressed longitudinal fibers reach the ultimate strength and start a catastrophic failure. The onset of failure and the failure mode are considered to be fiber controlled in the multidirectional composites. This is because of stiffness of the fibers in the diagonal or oppositely disposed laminae wherein most of the forces from the interrupted longitudinal fibers flow through the interlaminar matrix into the diagonal fibers and then back into the uninterrupted longitudinal fibers. The matrix shear transfer then occurs over the interlaminar interface and because of the great extent of the interface transfer area, these shear stresses are lower than were the maximum intralaminar shear stresses in the unidirectional composites. The fracture of the multidirectional composites occurs because the longitudinal fiber stresses reach the fiber strength before the matrix shear stresses reach the matrix shear strength. Thus, comparatively little load redistribution occurs before total fracture of the composite. To redistribute the stress around a notch or other opening, the local shear stress between laminae of unlike orientation car be increased by grouping laminae of like orientation. In the present invention, however, it has been shown the matrix shear strength can be reduced by partially separating the graphite/epoxy laminae with a thin perforated polyester film. In the specific examples of the present invention described herein, a 0.014 mm thick perforated polyethylene terepthalate film, commercially available under the Dupont tradename "Mylar", was used as the separating layer between adjacent laminae in a composite layup. The adjacent laminae are thus bonded through each perforation, but because of the poor Mylar-to-epoxy bond, the laminae are essentially unbonded elsewhere.

The particular shape of the perforations in the thin polyester films does not appear to be critical and test results obtained with both round and rectangular shaped openings were essentially identical. It was also found that the open area in the polyester film could range between 35–45% of the total film area and still obtain adequate bonding between the adjacent prepreg tape layers. Also, the polyester film layers need not be inserted between each adjacent layer of prepreg since test results showed that, even in composites constructed with only one layer of perforated foil within the composite body, the physical characteristics of the composites was improved. For maximum fracture and impact improvement, however, a layer of the perforated foil would be employed in each adjacent two layers of the prepreg material. Also, the layup for the prepreg material need not be confined to the 0, ±45°, 90°, layup but may be laid up such that the fibers in adjacent laminae are disposed in various angular relationships to that of the next adjacent laminae. It is preferred, however, that at least 40% of the fibers within the composite body be oriented in the load direction area anticipated for use with the composite body.

All fracture and impact specimens of the present invention and the control specimens were tested in a 1 MN servo-hydraulic testing machine. Also, all tension and compression tests were made in a 100 MN servo-hydraulic testing machine. In a series of comparative tests, the interlaminar strength of unidirectional and multidirectional composites was shown to be reduced by placing perforated Mylar films between laminae; tests on notched and slotted specimens showed that the interlaminar films promoted delamination and longitudinal cracking near the notches and that, as a result, toughness, notch-strength and impact strength were substantially increased.

The specifically described examples and process described herein are considered exemplary to describe the present invention and are not to be deemed as exhaustive. There are obviously many modifications and variations of the present invention that will be readily apparent to those skilled in the art in the light of the above teachings without departing from the spirit and scope of the appended claims.

What is claimed as new and desired to be secured by Letters Patent of the United States is:

1. A method for enhancing interlaminar shear strength for composite laminates comprising:
   providing prepreg resin impregnated fiber tape material having the fibers therein running the length of the tape;
   cutting the prepreg tape into a plurality of desired lengths;
   laying up and stacking the plurality of lengths of tape in layers of the desired dimensions and to a predetermined thickness;
   providing a layer formed by a plurality of thin perforated polyester film strips of essentially the same length and width dimensions as the prepreg tape layers;
   positioning one layer of the perforated film strips between each layer of prepreg tape and curing the stacked tape and film strip assembly into a unitary mass under vacuum, pressure and an elevated temperature of at least 465° K. for at least 60 minutes;
   cooling the cured assembly to a minimum of 400° K. while maintaining the vacuum and pressure and, after releasing the vacuum and pressure, permitting the assembly to cool to room temperature to thereby yield a composite laminate structure having improved physical property characteristics.

2. The process of claim 1 wherein the same fiber orientation is maintained for each prepreg tape layer during layup assembly.

3. The process of claim 1 wherein the fiber orientation of each prepreg tape layer is angularly disposed relative to the fiber orientation of each adjacent layer.

* * * * *